United States Patent [19]

Tanaka et al.

[11] 4,336,487
[45] Jun. 22, 1982

[54] GENERATION CONTROL APPARATUS FOR VEHICLE GENERATORS

[75] Inventors: Shigeru Tanaka, Kariya; Katsutaro Iwaki, Chiryu; Hajime Matsuhashi, Kariya; Keiichiro Banzai, Toyota all of Japan

[73] Assignee: Nippondenso Co., Ltd., Kariya, Japan

[21] Appl. No.: 156,466

[22] Filed: Jun. 4, 1980

[30] Foreign Application Priority Data

Jun. 7, 1979 [JP] Japan .................................. 54-71961

[51] Int. Cl.³ .............................................. H02J 7/14
[52] U.S. Cl. ....................................... 322/99; 320/64; 322/28
[58] Field of Search ............... 320/48, 64, 68; 322/28, 322/99

[56] References Cited

U.S. PATENT DOCUMENTS

| | | | |
|---|---|---|---|
| 3,656,135 | 4/1972 | Ruff | 322/99 UX |
| 3,764,879 | 10/1973 | Hill | 320/48 |
| 3,944,905 | 3/1976 | Allport et al. | 322/28 X |
| 3,959,708 | 5/1976 | Allport et al. | 322/28 X |
| 4,019,120 | 4/1977 | Fattic | 322/28 |
| 4,121,146 | 10/1978 | Hill | 320/64 X |

Primary Examiner—Robert J. Hickey
Attorney, Agent, or Firm—Cushman, Darby & Cushman

[57] ABSTRACT

A generation control apparatus for a vehicle generator includes an energization circuit consisting of an energization path forming resistance element and switching means and provided between the output terminal of a rectifier circuit of the generator and the ground, and an oscillator circuit responsive to the voltage at the output terminal of the rectifier circuit to always oscillate and control the energization circuit, whereby an energization path is intermittently provided in response to the output signal of the oscillator circuit. If a generation fault condition is detected, current is caused to flow from a battery through a key switch, indicator means and the energization path forming resistor intermittently and the driver of the vehicle is alerted to the generation fault of the generator or a break in an excitation circuit by a flashing of the indicator means.

7 Claims, 3 Drawing Figures

FIG. I
PRIOR ART
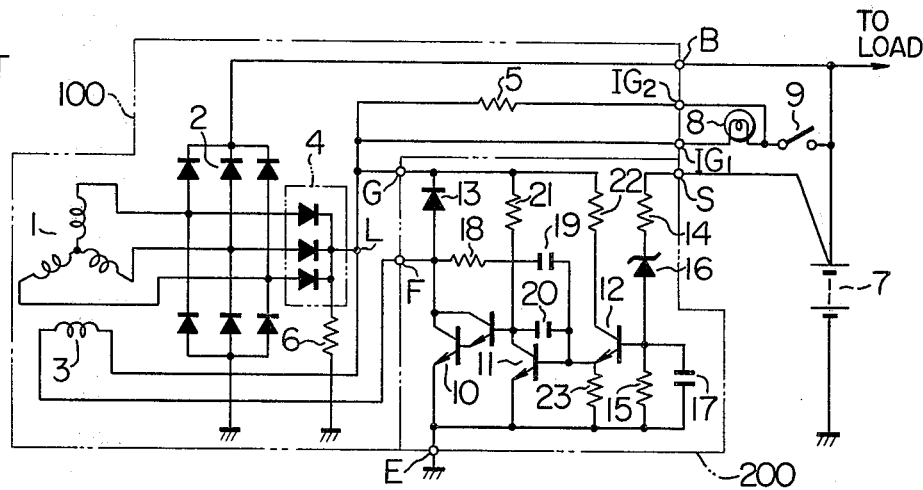
FIG. 2
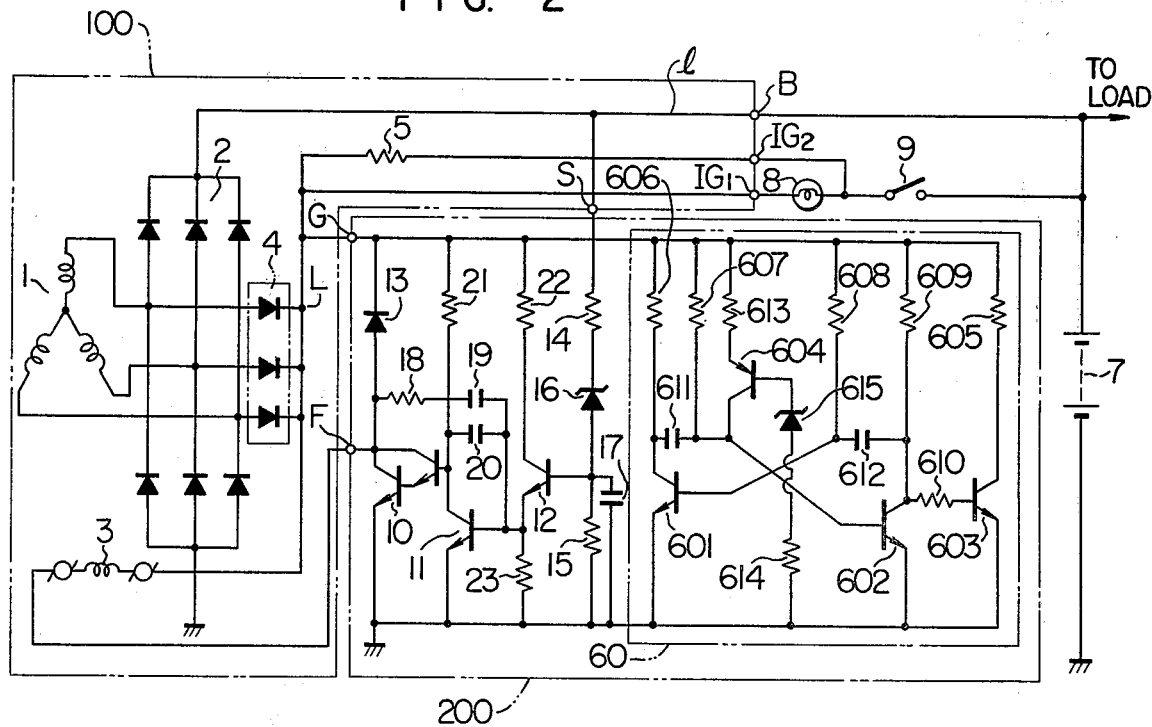
FIG. 3
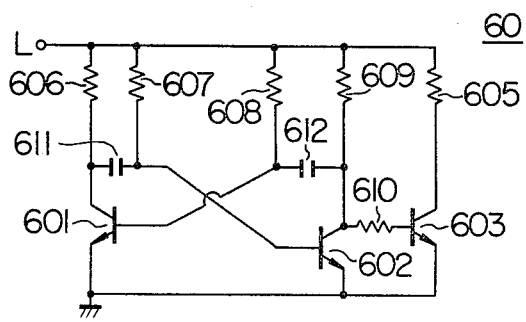

GENERATION CONTROL APPARATUS FOR VEHICLE GENERATORS

FIELD OF THE INVENTION

The present invention relates to generation control apparatus for vehicle generators, and more particularly the invention relates to an apparatus for detecting and indicating a break in the excitation circuit extending from the excitation winding of a generator to the ground through a switching means.

The background and preferred embodiments of the present invention will now be described with reference to the accompanying drawings.

BRIEF DESCRIPTION OF THE DRAWINGS

FIG. 1 is a circuit diagram showing a prior art electric generating system.

FIG. 2 is a circuit diagram showing an embodiment of a generation control apparatus according to the present invention.

FIG. 3 is a circuit diagram showing another embodiment of the break detecting circuit section shown in FIG. 2.

DESCRIPTION OF THE PRIOR ART

For better understanding of the present invention, the prior art will now be described. FIG. 1 is an electric circuit diagram of a prior art electric generating system. In the Figure, numeral 100 designates a three-phase AC type generator assembly which is driven by a vehicle engine and comprising armature windings 1, a first rectifier circuit 2 including a three-phase full-wave rectifier, an excitation winding 3, a second rectifier circuit 4 consisting of excitation current supplying diodes, an initial excitation resistor 5 and a break detecting resistor 6. Numeral 200 designates a block for a generation control circuit mainly comprising a voltage regulating circuit for regulating the generated voltage at a predetermined value. Numeral 7 designates a vehicle battery, 8 a charge indicator lamp, and 9 a key switch which is usually comprised of an ignition switch.

The voltage regulating circuit comprises Darlington-connected transistors 10 forming switching elements which provide an excitation circuit extending from an output terminal L of the second rectifier circuit 4 to it through the excitation winding 3, control transistors 11 and 12, a counter-electromotive force absorbing diode 13, voltage dividing resistors 14 and 15 forming a detecting circuit for detecting the battery terminal voltage, a Zener diode 16, a smoothing capacitor 17, a resistor 18 and a capacitor 19 forming a positive feedback circuit, an operation stabilizing capacitor 20, and resistors 21, 22 and 23.

In the Figure, symbol S designates an input terminal for detecting the battery terminal voltage, F a terminal for exciting purposes, G an input terminal for obtaining the excitation power supply, B a generator output terminal, IG$_1$ a lamp driving terminal, and IG$_2$ an input terminal for initial excitation purposes.

The operation of this prior art system will now be described. The generating system includes the voltage regulating circuit and the break detecting resistor, and the voltage regulating circuit will be described first. When the key switch 9 is closed, the generator 100 is not generating as yet so that no voltage appears at the output terminal L of the second rectifier circuit 4 and current flows from the battery 7 to the voltage regulating circuit through the lamp 8 and the initial excitation resistor 5, thus turning the transistors 10 on. When this occurs, the lamp 8 is turned-on and the excitation winding 3 is energized initially. Thereafter, as the engine is started so that the generator starts generating and the second rectifier circuit 4 generates a voltage which is substantially equal to the terminal voltage of the battery 7, the potential difference across the lamp 8 is decreased and the lamp 8 is turned off. Then, as the generated voltage rises further so that it exceeds a predetermined value, the Zener diode 16 is turned on and the transistors 11 and 12 are turned on. Thus, the transistors 10 are turned off and the current flow to the excitation winding 3 is stopped to deenergized it. As a result, the terminal voltage of the battery 7 is decreased and it eventually drops below the predetermined value, with the result that the Zener diode 16 is turned off and the transistors 11 and 12 are turned off. Thus, the transistors 10 are turned on and the flow of current to the excitation winding 3 is restarted to energize it. Thereafter, the same process is performed repeatedly so as to maintain the terminal voltage of the battery at the predetermined value determined by the Zener voltage, etc.

On the other hand, the break detecting circuit of the prior art generating system is formed by the break detecting resistor 6 connected between the output terminal L of the second rectifier circuit 4 and the ground.

If a generation fault occurs due to for example a break in the excitation circuit, current flows from the battery 7 to the energization circuit including the lamp 8, the initial excitation resistor 5 and the resistor 6 so that the lamp 8 is turned on and the driver is alerted to the occurrence of the break in the excitation circuit.

The prior art system of FIG. 1 has the following disadvantages:

1. Since the resistor 6 is connected between the terminal L and the ground, the impedance between the terminal L and the ground is decreased with the resulting decrease in the voltage between the terminal L and the ground when the key switch 9 is turned on. In other words, the initial excitation current applied to the excitation winding 3 is also decreased. Thus, the generation starting speed of the generator is also raised (the results of some experiments have shown a rise of about 300 rpm).

2. In the case of this prior art system, if a break occurs in the excitation circuit, a voltage $E_L$ is applied to the lamp 8 and the voltage $E_l$ is given by the following equation if $R_5$ represents the resistance value of the initial excitation resistor 5, $R_8$ the resistance value of the lamp 8, $R_6$ the resistance value of the break detecting resistor 6 and $E_B$ the terminal voltage of the battery 7

$$E_L = E_B \cdot \frac{\left(\frac{1}{R_8} + \frac{1}{R_5}\right)^{-1}}{R_6 + \left(\frac{1}{R_8} + \frac{1}{R_5}\right)^{-1}}$$

Thus, if it is desired to set sufficiently high the luminance of the lamp 8 in the existence of a break, it is necessary to decrease further the resistance $R_6$ and the experimental results show that it is necessary to select $R_6 = 10 \, \Omega$ if the terminal voltage of the battery 7 is 12 V, $R_5 = 30 \, \Omega$ and $R_8 = 40 \, \Omega$. Thus, in the normal generating condition a voltage of about 15 V is applied from the output terminal L and the resulting nonbreaking power to the break detecting resistor 6 amounts to about $V_L^2/R_6 \approx 15 \times 15/10 = 22.5$ W (where $V_L$ is the output voltage when the generator is generating). As a result, the resistor 6 must be increased greatly in size and shape so as to increase its power capacity, thus restricting increasingly its mounting on the generator and increasing its generation of heat requiring the use of a thermal protective device or the like. Another disadvantage is that since the break detecting resistor 6 is always connected as an electric load of the second rectifier circuit 4, a diode having a large current capacity must be used for each of those forming the second rectifier circuit and moreover the effective output current derivable from the generator is decreased by that amount flowing to the resistor 6.

The present invention has been made with a view to overcoming the above-mentioned deficiencies of the prior art.

SUMMARY OF THE INVENTION

It is the object of the present invention to provide an improved generation control apparatus for vehicle generators wherein when a fault such as a break occurs in the excitation circuit of a generator the driver is informed of the fault by means of indicator means for charge indicating purposes, while in the normal generating condition the power consumption of an indicator means driving energization resistor is reduced as far as possible, thus making it possible to set the power capacity of the resistor extremely small as compared with that used previously, reducing the resistor in shape and size making the use of integrated circuit techniques advantageous and increasing the generated output in the normal generating condition due to the fact that practically all the output of the second rectifier circuit is used solely for excitation purposes.

In accordance with the present invention there is thus provided an improved generation control apparatus for vehicle generators comprising an energization circuit including an energization path forming resistor and switching means and provided between the output terminal of the second rectifier circuit of a vehicle generator and the ground, and an oscillator circuit arranged so as to be always oscillated by the voltage at the output terminal of the second rectifier circuit to control the energization circuit and thereby to intermittently form an energization path in accordance with the output signal of the oscillator circuit, whereby when at least a generation fault is detected, current is supplied intermittently from the battery through the key switch, the indicator and the energization resistor so as to cause the indicator to flash on and off, and in this way when a generation fault of the generator occurs, particularly when a break occurs in the excitation circuit, the driver is positively alerted to the fault. In accordance with another form of the invention, the period of oscillator output signal is adjusted so as to satisfactorily set the ratio of off-time to on-time for the energization path and thereby to ensure a sufficient initial excitation of the generator and also to prevent any rise in the generation starting speed of the generator.

DESCRIPTION OF THE PREFERRED EMBODIMENTS

The present invention will now be described in greater detail with reference to the illustrated embodiments.

Referring to FIG. 2, there is illustrated an embodiment of a generation control apparatus for vehicle generators according to the present invention. In the Figure, the same reference numerals as used in FIG. 1 designate the identical elements.

In FIG. 2, the voltage regulating circuit for regulating the generated voltage at a predetermined value is substantially identical in construction with that of the prior art generating system shown in FIG. 1 except that a terminal S is connected to a charge line 1 and will not be described.

A break detecting circuit 60 constituting a principal part of the present invention will now be described. The break detecting circuit 60 serves as a substitute for the break detecting resistor 6 of the prior art system shown in FIG. 1. The break detecting circuit 60 comprises an astable multivibrator including resistors 606 to 609, capacitors 611 and 612 and transistors 601 and 602, a frequency and on-off ratio control circuit including resistors 613 and 614, a transistor 604 and a Zener diode 615 for detecting the generation of the generator, and an energization circuit including a transistor 603, a break detecting and lamp driving energization resistor 605 having a relatively small resistance value and a small capacity as compared with the resistor 6 and a base resistor 610 for giving an indication when there is a break in the excitation circuit.

The operation of the break detecting circuit 60 will now be described. Firstly, in the absence of any fault in the excitation circuit, when the key switch 9 is closed, the transistors 10 are turned on and the voltage at the output terminal L of the second rectifier circuit 4 is reduced to a predetermined divisional voltage value which is lower than the battery voltage, thus preventing the Zener diode 615 from being turned on. As a result, the on-off time ratio of the oscillator circuit may for example be given in terms of the transistor 603 by $T_{ON}:T_{OFF} = (R_{607} \cdot C_{611} \cdot l_n2):(R_{608} \cdot C_{612} \cdot l_n2)$, where $R_{607}$, $R_{608}$, $C_{611}$ and $C_{612}$ are respectively the resistance values of the resistors 607 and 608 and the capacitances of the capacitors 611 and 612 and $T_{ON}$ and $T_{OFF}$ are respectively the duration of the on-time and off-time of the transistor 603.

When the generator is generating, the output terminal L of the second rectifier circuit 4 rises substantially to the previously-mentioned predetermined voltage (e.g. 14 to 15 V) so that the Zener diode 615 is turned on and the transistor 604 is turned on in the frequency changing circuit. The resulting on-off ratio or duty ratio of the oscillator circuit may be given in terms of the transistor 603 by $T_{ON}:T_{OFF} = (R_g \cdot C_{611} \cdot l_n2):(R_{608} \cdot C_{612} \cdot l_n2)$, where $R_g$ is the parallel combined resistance value of the resistors 607 and 613 or $R_g = R_{607} \cdot R_{613}/(R_{607} + R_{613})$. Thus, it is designed so that the duty ratio (frequency) of the oscillator circuit varies in accordance with the generated voltage of the generator.

For example, if it is selected so that $R_{607} = R_{608} = 100$ K$\Omega$, $C_{611} = C_{612} = 7.2$ $\mu$F and $R_{613} = 1$ K$\Omega$, then the duty ratio of the oscillator circuit is given as follows.

1. In the initial excitation condition and the excitation circuit break condition:

$$T_{ON}:T_{OFF} = (R_{607} \cdot C_{611} \cdot l_n2):(R_{608} \cdot C_{612} \cdot l_n2)$$
$$= 0.5(sec):0.5(sec) = 1:1$$

2. In the normal generating condition:

$$T_{ON}:T_{OFF} = \left( \frac{R_{607} \cdot R_{613}}{R_{607} + R_{613}} \cdot C_{611} \cdot l_n 2 \right) : (R_{608} \cdot C_{612} \cdot l_n 2)$$

$$= 5 \times 10^{-3}(sec):0.5(sec) = 1:100$$

While, in the description of the prior art, it has been pointed out that the connection of the break detecting resistor between the terminal L and the ground in FIG. 1 results in a higher generation starting speed for the generator, in the apparatus of this invention the oscillator circuit continues oscillating even during the initial excitation so that the generator instantaneously rises to a generation starting speed at least in the time $T_{OFF}=0.5$ seconds (in this time interval it is the same as though the break detecting resistor 605 were not connected) and thus the use of the break detecting resistor 605 has no possibility of resulting in a higher generation starting speed for the generator.

On the other hand, when there is a break in the excitation circuit, the oscillator circuit oscillate at $T_{ON}:T_{OFF}=0.5(sec):0.5(sec)$ and thus the lamp 8 flashes on and off. As a result, a break in the excitation circuit can be accurately distinguished from any other fault condition so as to alert the driver to it.

In the normal generating condition, due to the fact that the duty ratio of 1/100 is predetermined as mentioned previously for the energization of the break detecting resistor 605 in response to the turning on of the transistor 605, the consumption of power by the resistor 605 is also reduced to 1/100, thus making it possible to reduce the resistor 605 in size and manufacture it by integrated circuit techniques advantageously.

It will thus be seen that the oscillator circuit constituting the principal part of the invention is always oscillating (irrespective of whether the generator is generating or not) and its duty ratio is designed to assume different values for the initial excitation and excitation circuit break condition and the normal generating condition, as follows.

(1) In the initial excitation condition, the break detecting resistor is switched on and off at $T_{ON}:T_{OFF}\approx 0.5(sec):0.5(sec)$ and in the $T_{OFF}$ periods it is the same as if the break detecting resistor were not connected, allowing the generator to start generating in the $T_{OFF}$ period. Thus, the generator is not delayed in starting generating due to the connection of the break detecting resistor.

(2) When there is a break in the excitation circuit, in the like manner as in the case of (1), the oscillator circuit oscillates at $T_{ON}:T_{OFF}\approx 0.5(sec):0.5(sec)$ and the lamp 8 also flashes on and off at the same duty ratio. In this case, however, it is necessary to select the relation between $T_{ON}$ and $T_{OFF}$ such that the flashing can be perceived by the human eyes. When any other fault condition occurs, the lamp 8 lights continuously so that the occurrence of a break in the excitation circuit can be clearly distinguished from any other fault condition so as to alert the driver to it.

(3) In the normal generating condition, the resistor 605 is switched on and off at $T_{ON}:T_{OFF}\approx 5\times 10^{-3}(sec):0.5(sec)=1:100$ and the duty cycle of $T_{ON}$ is reduced to 1/100, thus minimizing the power consumption of the resistor 605, reducing its size and making possible its manufacture by integrated circuit techniques.

Referring to FIG. 3, there is illustrated another embodiment of the break detecting circuit 60 according to the invention. In the Figure, the same reference numerals as used for the component elements of the break detecting circuit 60 of FIG. 2 designate the same elements.

The oscillator circuit of FIG. 3 differs from the oscillator circuit of FIG. 2 in that the circuit oscillates at the same duty ratio in the initial excitation condition, excitation circuit break condition and normal generating condition. This embodiment can produce the same effect with the previously described embodiment as will be described hereunder.

The duty ratio of this oscillator circuit is given in terms of the transistor 603 by $T_{ON}:T_{OFF}=(R_{607}\cdot C_{611}\cdot l_n 2):(R_{608}\cdot C_{612}\cdot l_n 2)$. Thus, if it is for example selected so that $R_{607}=10$ K$\Omega$, $C_{611}=72$ $\mu$F, $R_{608}=100$ K$\Omega$ and $C_{612}=72$ $\mu$F, then $T_{ON}:T_{OFF}=0.5(sec):5(sec)=1:10$. In the case of this embodiment, however, the frequency of the oscillator output signal must be set to a value (usually less than about 10 Hz) so that the driver can perceive the flashing of the lamp 8 when it is operated by the oscillator output signal.

As a result, in the initial excitation condition caused by the closing of the key switch, the oscillator circuit continues to oscillate and thus the generator fully starts generating in the time interval $T_{OFF}=5(sec)$ during which the transistor 603 is turned off. On the other hand, when the generator starts generating and continues to generate properly, the flow of current to the break detecting and energizing resistor 605 is limited by the duty ratio of 1/10 and the power consumption of the resistor 605 is reduced to 1/10 of that consumed previously. If a break occurs in the excitation circuit, the generator stops generating and the generated voltage no longer appears at the terminal L. Thus, the oscillator circuit is directly operated by the battery voltage so that the lamp 8 flashes on and off with the duty ratio of 1/10 and the driver is alerted to the fault condition.

It will thus be seen from the foregoing description that the generation control apparatus according to the invention features in that an oscillator circuit is provided so as to always oscillate in response to the voltage at the output terminal of a second rectifier circuit of a generator and an energizing resistor is intermittently connected between the output terminal of the second rectifier circuit and the ground in response to the output signal of the oscillator circuit, whereby the frequency and duty ratio of the oscillator output signal may be suitably set so that upon occurrence of a fault condition such as an excitation circuit break a charge indicating indicator means is caused to flash on and off to alert the driver to the fault condition and the initial excitation is also effected satisfactorily during the off period of the energization path thus effectively preventing any rise in the generation starting speed of the generator, and that also in the normal generating condition the energization path is switched on and off thus reducing the power consumption of the energizing resistor as far as possible and thereby reducing the power capacity requirement of the resistor and decreasing the resistor in size and shape.

We claim:

1. A generation control apparatus for vehicle generators comprising:
 a vehicle A.C. generator having armature windings and an excitation winding;
 a battery;

indicating means including a lamp or the like for indicating a status of said A.C. generator;

a key switch;

a first rectifier circuit connected to said armature windings, said first rectifier circuit having a first rectified output terminal connected to said battery;

a second rectifier circuit connected to said armature windings, said second rectifier circuit having a second rectified output terminal connected to said battery through said indicating means and said key switch;

a voltage regulating circuit connected to said second rectified output terminal through said excitation winding, for regulating a generated voltage of said vehicle A.C. generator at a predetermined value;

break detecting circuit means, connected to said second rectified output terminal in parallel with said voltage regulating circuit, for detecting a break of a line in the circuit of said excitation winding; and an energization circuit for causing, responsive to an output of said break detecting circuit a current to intermittently flow said indicating means in such an on/off ratio that it flashes on and off at a human perceivable rate when the break of said line is detected by said break detecting circuit.

2. A generation control apparatus for vehicle generators according to claim 1, wherein said voltage regulating circuit comprises a switching circuit forming an excitation circuit, and said break detecting circuit means comprises an oscillator circuit disposed to oscillate in response to a voltage at said second rectified output terminal and an output transistor connected to the output terminal of said oscillator circuit.

3. A generation control apparatus for vehicle generators according to claim 2, wherein said break detecting circuit means further includes resistance means operatively connected to said oscillator circuit to detect the generation of power by said vehicle A.C. generator, and means for changing the on/off ratio of the output of said oscillator circuit, which is connected in series with said resistance means.

4. A generation control apparatus for vehicle generators comprising:

a vehicle A.C. generator having armature windings and an excitation winding;

a battery;

indicating means including a lamp or the like for indicating a status of said A.C. generator;

a key switch;

a first rectifier circuit, connected to said armature windings, having a first rectified output terminal connected to said battery;

a second rectifier circuit, connected to said armature windings, having a second rectified output terminal connected to said battery through said indicating means and said key switch;

a voltage regulating circuit connected to said second rectified output terminal through said excitation winding, for regulating a generated voltage of said vehicle A.C. generator at a predetermined value; and an oscillator circuit arranged so as to be connected to said second rectifier circuit and further connected to said battery through said key switch and indicating means, for generating a signal whose on/off ratio varies in accordance with the generated voltage of said A.C. generator, the on/off ratio being larger when the generator is not generating than when the generator is operating normally, the oscillator circuit including switching means for making said indicating means flash on and off in accordance with the signal whose on/off ratio varies.

5. A generation control apparatus for vehicle generators according to claim 4, wherein the on/off ratio in the normal generating condition of the vehicle generator is about 1/100 and the on/off ratio in the ungenerating condition is 1/1.

6. A generation control apparatus for vehicle generators comprising:

a vehicle A.C. generator having armature windings and an excitation winding;

a battery;

indicating means including a lamp or the like for indicating a status of said A.C. generator;

a key switch;

a first rectifier circuit connected to said armature windings, said first rectifier circuit having a first rectified output terminal connected to said battery;

a second rectifier circuit connected to said armature windings, said second rectifier circuit having a second rectified output terminal connected to said battery through said indicating means and said key switch;

a voltage regulating circuit connected to said second rectified output terminal through said excitation winding, for regulating a generated voltage of said vehicle A.C. generator at a predetermined value; and an oscillator circuit arranged so as to be connected to said second rectifier circuit and further connected to said battery through said key switch and indicating means, for (a) generating a signal having a constant on/off ratio making said indicating means flash on and off at a human perceivable rate in the ungenerating condition of said A.C. generator and (b) not flashing said indicating means when said A.C. generator is operating normally.

7. A generation control apparatus for vehicle generators according to claim 6, wherein said on/off ratio is approximately 1/10.

* * * * *